United States Patent
Donderici et al.

(10) Patent No.: US 10,901,111 B2
(45) Date of Patent: Jan. 26, 2021

(54) ADAPTIVE WORKFLOWS FOR ARTIFACT IDENTIFICATION IN ELECTROMAGNETIC PIPE INSPECTION

(71) Applicant: Halliburton Energy Services, Inc., Houston, TX (US)

(72) Inventors: Burkay Donderici, Pittsford, NY (US); Ilker R. Capoglu, Houston, TX (US); Ahmed Elsayed Fouda, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 5 days.

(21) Appl. No.: 16/479,553

(22) PCT Filed: Jun. 25, 2018

(86) PCT No.: PCT/US2018/039304
§ 371 (c)(1),
(2) Date: Jul. 19, 2019

(87) PCT Pub. No.: WO2020/005194
PCT Pub. Date: Jan. 2, 2020

(65) Prior Publication Data
US 2020/0309986 A1 Oct. 1, 2020

(51) Int. Cl.
*E21B 47/092* (2012.01)
*G01V 3/28* (2006.01)
*G01V 3/38* (2006.01)

(52) U.S. Cl.
CPC .............. *G01V 3/38* (2013.01); *E21B 47/092* (2020.05); *G01V 3/28* (2013.01)

(58) Field of Classification Search
CPC .......... G01V 3/26; G01V 3/38; G01V 99/005; G01V 3/30; G01V 1/40; G01V 3/28;
(Continued)

(56) References Cited

U.S. PATENT DOCUMENTS

| 6,084,403 A | 7/2000 | Sinclair et al. |
| 2012/0215502 A1* | 8/2012 | Mijares ................... E21B 43/00 703/2 |

(Continued)

FOREIGN PATENT DOCUMENTS

| GB | 2569491 | 6/2019 |
| WO | 2015157270 | 10/2015 |

(Continued)

OTHER PUBLICATIONS

ISRWO International Search Report and Written Opinion for PCT/US2018/039304 dated Apr. 4, 2019.

*Primary Examiner* — John E Breene
*Assistant Examiner* — Jeffrey P Aiello
(74) *Attorney, Agent, or Firm* — John Wustenberg; C. Tumey Law Group PLLC

(57) ABSTRACT

A method for identifying an artifacts disposed on concentric pipes may comprise disposing an electromagnetic logging tool into a first wellbore, broadcasting an electromagnetic field from a transmitter disposed on the electromagnetic logging tool, energizing a casing with the electromagnetic field, and recording a secondary electromagnetic field from the casing at a plurality of depths and at a plurality of frequencies. The method may further comprise picking a first plurality of artifacts in the first signal, constructing a target value matrix from the first plurality of artifacts, producing a first input matrix from the first signal and a first well plan, and constructing a predictor from the first input matrix and the target value matrix. Additionally, disposing the electromagnetic logging tool into a second wellbore and producing a second plurality of artifacts from the predictor and the second input matrix.

25 Claims, 10 Drawing Sheets

(58) Field of Classification Search
CPC ...... E21B 47/00; E21B 49/00; E21B 41/0092; G05B 13/028
USPC ....... 166/250.01; 175/40; 324/303; 702/6–9, 702/11, 188
See application file for complete search history.

(56) References Cited

U.S. PATENT DOCUMENTS

| | | | |
|---|---|---|---|
| 2013/0056202 A1* | 3/2013 | Maida | E21B 47/092 166/255.1 |
| 2014/0114892 A1* | 4/2014 | Quirein | G06N 5/047 706/20 |
| 2014/0216734 A1* | 8/2014 | Hupp | E21B 47/13 166/255.1 |
| 2015/0346384 A1* | 12/2015 | Kalyanaraman | G01V 3/18 702/6 |
| 2016/0194948 A1* | 7/2016 | Donderici | E21B 47/092 324/338 |
| 2016/0290122 A1* | 10/2016 | San Martin | G01V 3/28 |

FOREIGN PATENT DOCUMENTS

| | | |
|---|---|---|
| WO | 2018031047 | 2/2018 |
| WO | 2018084863 | 5/2018 |
| WO | 2018084864 | 5/2018 |

\* cited by examiner

FIG. 4

(Plot of phase vs. logging position, with peaks at $Z_2$, $Z_3$, $Z_4$, bounded by $Z_1$ and $Z_5$.)

FIG. 5

Inputs to TRAINING (502): DEPTH, PIPE CONFIG., SIGNAL (INPUT SAMPLE MATRIX); COLLAR PICKS (TARGET VALUE MATRIX). Output feeds PREDICTOR (504) which also receives DEPTH, PIPE CONFIG., SIGNAL, and outputs COLLAR PICKS (506).

FIG. 6

| DEPTH [ft] | PIPE MASK pipe 1 | PIPE MASK pipe 2 | PIPE MASK pipe 3 | SIGNAL R1F1A (db) | SIGNAL R1F1P (°) | SIGNAL R2F1A (db) | SIGNAL R2F1P (°) |
|---|---|---|---|---|---|---|---|
| 30 | 1 | 1 | 1 | 10.23 | 9.76 | 5.21 | 121.23 |
| 31 | 1 | 1 | 0 | 11.32 | 8.88 | 6.54 | 15.82 |
| 32 | 1 | 1 | 0 | 10.89 | 7.37 | 6.43 | 17.17 |
| 33 | 1 | 1 | 0 | 10.93 | 8.21 | 6.31 | 18.11 |
| 34 | 1 | 0 | 0 | 11.02 | 9.02 | 5.85 | 18.21 |
| 35 | 1 | 0 | 0 | 11.45 | 10.22 | 5.77 | 17.99 |
| 36 | 1 | 0 | 0 | 11.98 | 11.03 | 5.17 | 17.86 |

FIG. 7

| COLLAR PROXIMITY PIPE 1 | COLLAR PROXIMITY PIPE 2 | ⋯ | COLLAR PROXIMITY ANY PIPE |
|---|---|---|---|
| 0 | 1 | | 1 |
| 0 | 1 | | 1 |
| 1 | 1 | | 1 |
| 1 | 0 | | 1 |
| 0 | 1 | | 1 |
| 0 | 1 | | 1 |
| 1 | 0 | | 1 |
| 1 | 0 | | 1 |
| 0 | 0 | | 0 |

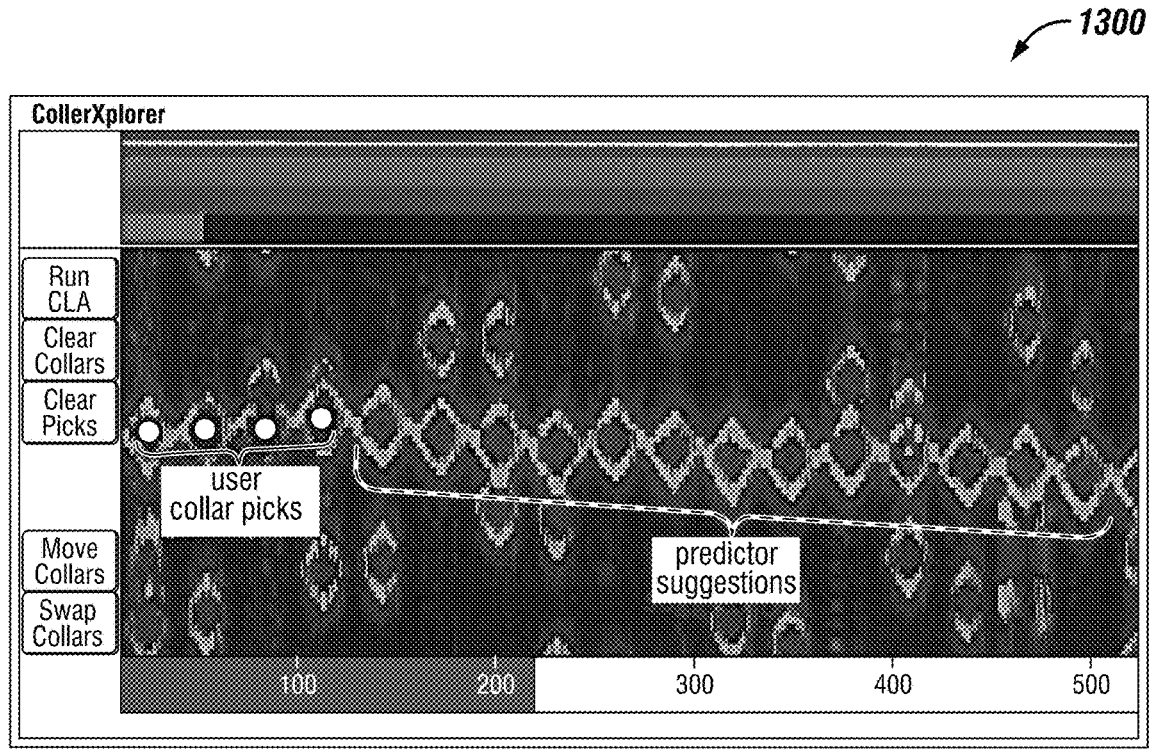
*FIG. 13*
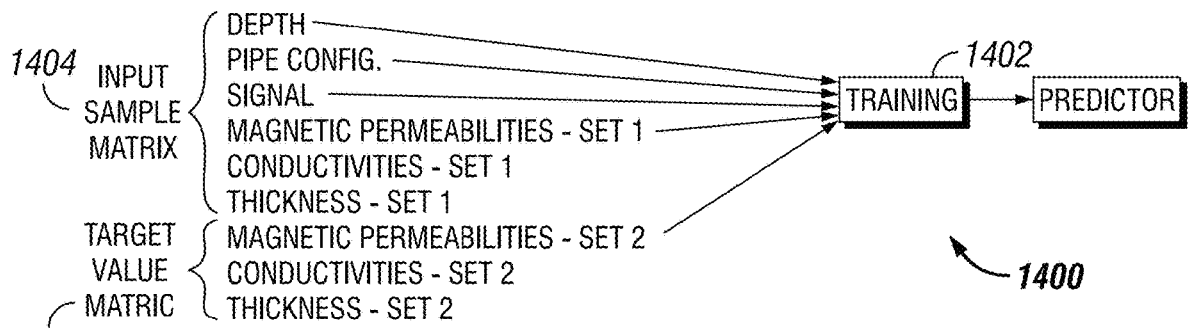
*FIG. 14*
| EMBODIMENT | SET 1 | SET 2 |
|---|---|---|
| 1 | NULL | BEFORE PROCESSING |
| 2 | FAST-MODE | FULL-MODE |
| 3 | BEFORE PROCESSING | AFTER PROCESSING |
| 4 | AFTER PROCESSING | IMPROVED AFTER PROCESSING |
*FIG. 15*

ADAPTIVE WORKFLOWS FOR ARTIFACT IDENTIFICATION IN ELECTROMAGNETIC PIPE INSPECTION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

FIG. 4 illustrates a graph of a recorded signal;

FIG. 5 illustrates a flow chart of a collar locator method;

FIG. 6 illustrates a matrix of an input sample matrix;

FIG. 7 illustrates a target matrix;

FIG. 13 illustrates a graph of located collars;

FIG. 14 illustrates a inversion workflow enhancement method;

FIG. 15 illustrates different embodiments of the inversion workflow enhancement method;

DETAILED DESCRIPTION

This disclosure may generally relate to methods for identifying artifacts with an electromagnetic logging tool in an eccentric pipe configuration comprising a plurality of pipes. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tools may include an independent power supply and may store the acquired data on memory. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe stings, the received signal may be anon-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point.

Figure 1:
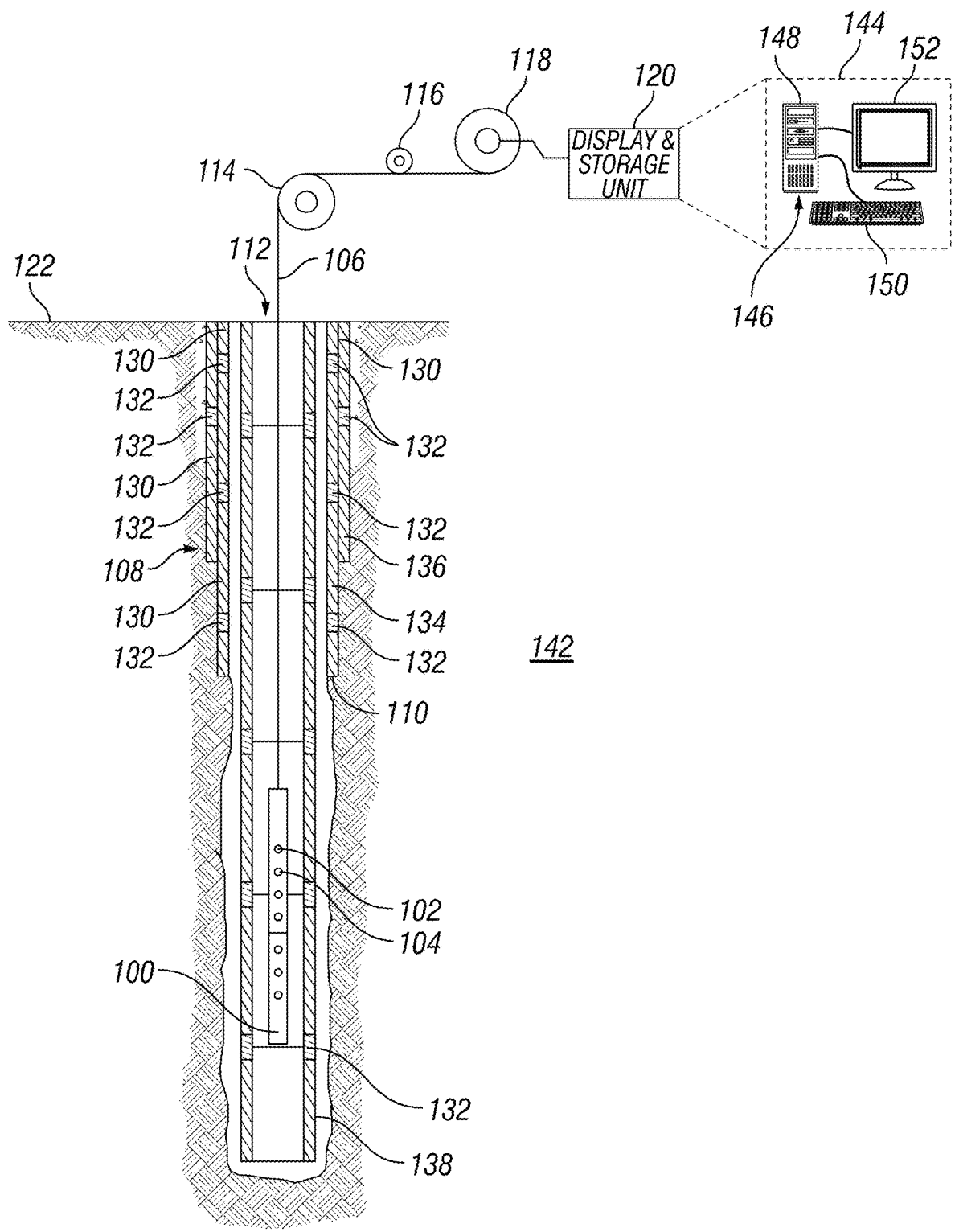
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may broadcast electromagnetic fields into subterranean formation 142. It should be noted that broadcasting electromagnetic fields may also be referred to as transmitting electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured with the primary electromagnetic fields by receivers 104.

Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by the transmitter 102 and the sensing and/or measuring of secondary electromagnetic fields by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on the EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \tag{1}$$

and the magnitude of the impedance shows the dependence:

$$\exp\left[-2\left(\sqrt{\frac{\omega\mu\sigma}{2}}\right)t\right] \tag{2}$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \tag{3}$$

The phase of the impedance varies as:

$$\varphi \cong 2\frac{t}{\delta} \tag{4}$$

and the magnitude of the impedance shows the dependence:

$$\exp\left[\frac{-2t}{\delta}\right] \tag{5}$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
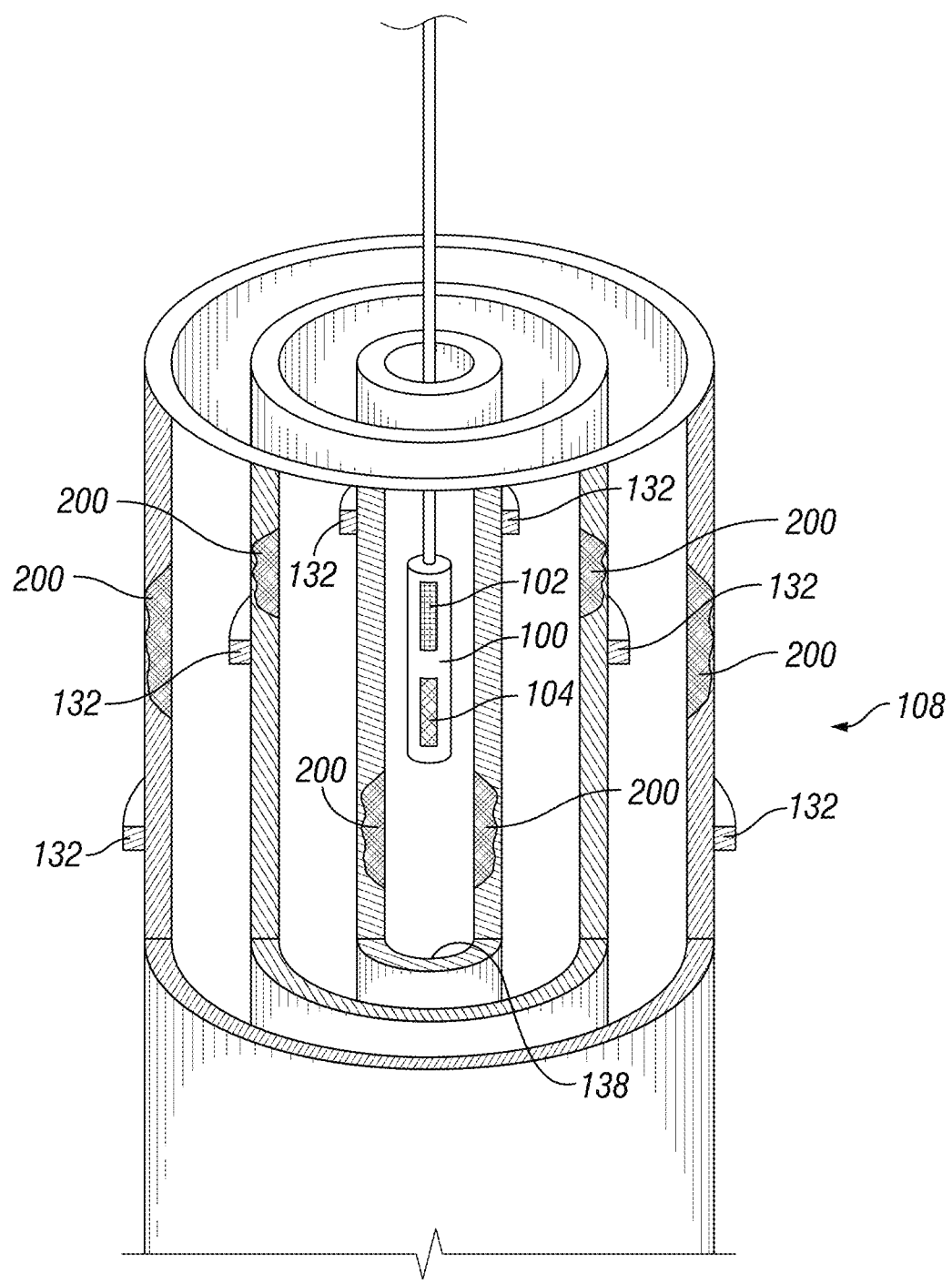
FIG. 2 illustrates an example of arbitrary defects within multiple pipes.
Figure 3A:
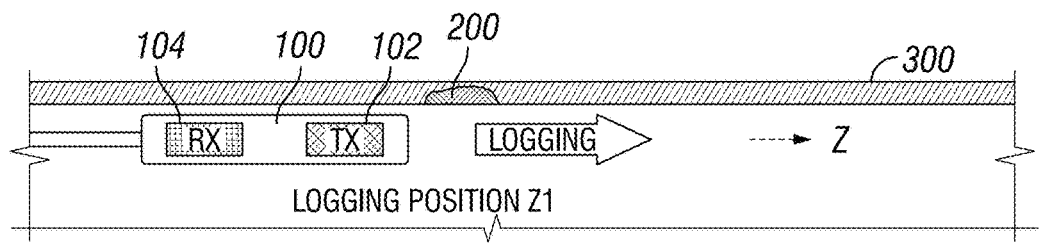
FIG. 3a illustrates an example of an EM logging tool traversing a wellbore.
Figure 3B:
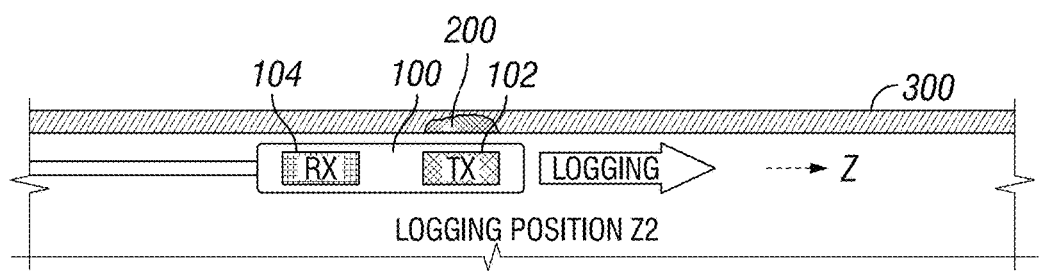
FIG. 3b illustrates another example of an EM logging tool traversing a wellbore.
Figure 3C:
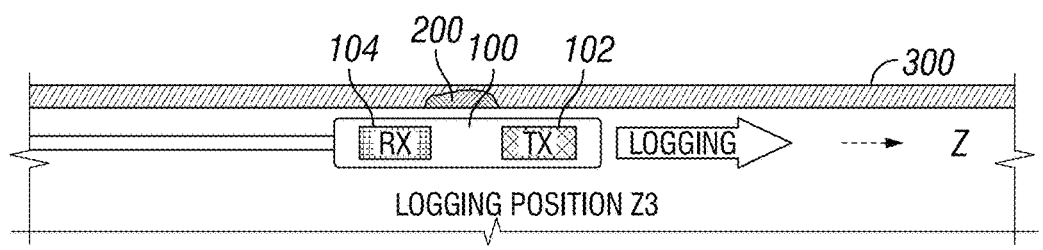
FIG. 3c illustrates another example of an EM logging tool traversing a wellbore.
Figure 3D:
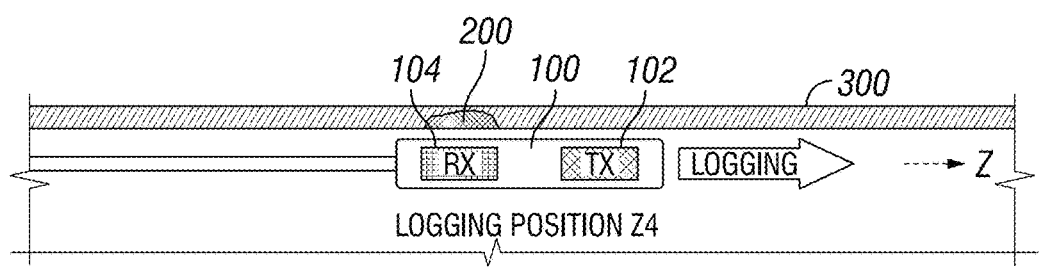
FIG. 3d illustrates another example of an EM logging tool traversing a wellbore.
Figure 3E:
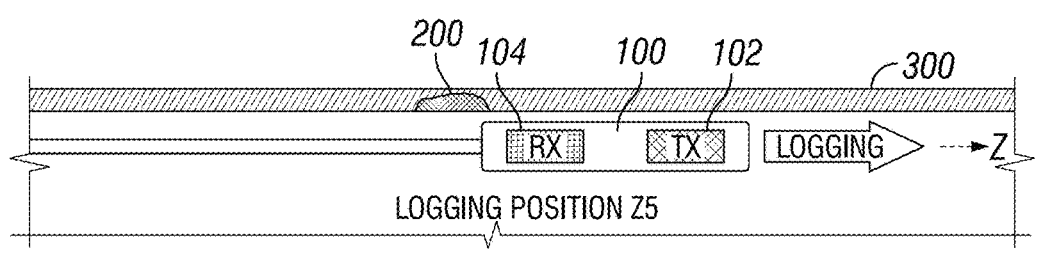
FIG. 3e illustrates another example of an EM logging tool traversing a wellbore.

FIG. 2 shows EM logging tool 100 disposed in pipe string 138 which may be surrounded by a plurality of nested pipes (i.e. first casing 134 and second casing 136) and an illustration of anomalies 200 disposed within the plurality of nested pipes. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet). Due to these complications, methods may need to be used to accurately inspect pipe features.

FIGS. 3a-3e illustrates an electromagnetic inspection and detection of anomalies 200 (i.e. defects) or collars 132 (e.g., Referring to FIG. 2). As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing and frequencies may be used. For example, short spaced transmitters 102 and receivers 104 may be sensitive to pipe string 138, while long spaced transmitters 102 and receivers 104 may be sensitive to deeper pipes (i.e. first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132. For example, deep pipe signals may be significantly lower than other signals, double peak indications (See FIG. 4) appear for long spaced transmitters 102 and receivers 104, and spatial spread of long spaced transmitter-receiver signal for a collar 132 may be longer (e.g., up to about six feet (about two meters)). Due to these complications, an advanced algorithm or workflow, may be used to accurately inspect pipe features in examples with more than two concentric pipes (i.e., first casing 124, second casing 136, etc.).

When determining pipe features, an operator may manually locate collars 132 (e.g., Referring to FIG. 1) in a data log through visual inspections of EM logging tool 100 short and long spaced signals ("picks"), and/or an automated algorithm that may detect collars 132 and assign each collar 132 a pipe index. An operator may utilize one and/or both of these approaches to determine the location of collars 132, however, each approach separately and/or in combination with each other may be time consuming. Additionally, automated algorithm may be tuned based on the field data obtained during a logging operation, and may produce skewed results in which conditions within wellbore 110 (e.g., Referring to FIG. 1) may be different from existing ones. As a result, in the case of a new geological area with a new completion configuration and materials (pipes etc.) used, an operator may revert to manual picking when analyzing a data log. Discussed below, an adaptive algorithm may be utilized to pick collars 132 in wellbore 110 in which there may be little to no information about wellbore 110.

FIG. 5 illustrates shows a box diagram for a collar locator method 500 with adaptive learning capabilities. In box 502, herein referred to as training operation 502, a module may be implemented in where a forward model is adjusted based on a "training set" data consisting of an input sample matrix and a target value matrix. A "matrix" is used to describe a two dimensional data structure where one dimension (rows) is sample index, and the other (columns) is data channel. It should be noted that the concepts described below may be independent of the specific choices made on the data representation of the input sample and target values. The word "matrix" may, however, be used for convenience in the descriptions below.

In examples, input samples consist of the training input data of the system, while target values consist of the training output data. When these input and output data are paired and/or concatenated into a concatenated matrix, they constitute a training set for the adaptive learning system. Input sample matrix may be comprised of depth, pipe configuration, and signal, while target value matrix may be comprised of an initial set of collar picks in collar proximity form. It should be noted that pipe configuration parameters may include a nominal thickness, a nominal inner diameter, a nominal outer diameter, a nominal magnetic permeability, or a nominal conductivity of pipe. Additionally, pipe configuration parameters may further include are a magnetic permeability of pipes, a conductivity of pipes, a diameter of pipes, an inner diameter of pipes, an outer diameter of pipes, a eccentricity of pipes, a thickness of pipes, a core properties of EM pipe inspection tool transmitters, a core properties of EM pipe inspection tool receivers, a logging depth, a location of an artifact, or an overlap of artifacts on different pipes. Any additional information, such as information from other tools (collar locator tools, neutron logging tools, acoustic logging tools etc.) may be included in the input sample matrix. FIG. 6 shows an example input sample matrix.

Similarly, target value matrix may be enhanced by including additional information such as individual collar proximity to different pipes, collar type, collar thickness or any other parameter that needs to be obtained from the model. FIG. 7 shows two example target value matrices. The collar proximity vector for any pipe may be obtained by setting the collar proximity value at each depth to a certain value (such as 1) when there is a collar 132 (e.g., Referring to FIG. 1) on the same pipe within a threshold distance (L), and setting the collar proximity value to another value (such as 0) otherwise. For example, in FIG. 7, an L of 1.5 feet (about 0.5 meter) is used. Alternatively, the collar proximity vector may be formed by convolving a collar mask (a vector that exhibits a discrete impulse at collar positions) with a rectangular window of size 2L.

Referring back to FIG. 5, collar locator method 500 may implement two inputs (input sample matrix and target value matrix) and performs a training operation 502. Machine learning techniques that may be used for the collar locator may be nearest neighbors, linear support vector machine, kernel vector machine, Gaussian process, decision tree, random forest, neural net, Ada Boost, Na'ive Bayes and quadratic classifier. In collar locator method 500 it may be important to pre-process the data to make the data space as uniform and dimensionally independent as possible. In order to perform pre-processing, a normalization process may be applied to filter the low frequency baseline from the input signal, and normalization may be applied to each resulting channel, which may be the same process used to obtain a variable density log ("VDL") representation of the signal for visualization. After training operation 502 may be applied, box 504, herein referred to as predictor 504, a predictor function, may be used to predict output 506 given any new input that may not be included in training operation 502. The new input may be in the same format as the original (for example, FIG. 6). Output 506 may be a list of collar pick locations in depth dimension.

In examples, the method for determining defects, discussed above, may be further refined. For example, a plurality of artifacts may be deviations corresponding to a plurality of defects on one or more concentric pipes. To refine the results, an input sample matrix may be created as a function of depth and a pipe configuration for each artifact. A plurality of input matrices, which may correspond to different types of defects may be concatenated into a concatenated matrix. The concatenated matrix may be redefined as a target value matrix. It should be noted that in examples, the input sample matrices may be appended with an auxiliary input matrix.

The target value matrix and the auxiliary input matrix may both be estimated through an inversion process. The auxiliary input matrix may found from a first forward modeling code. The target value matrix may be from a second forward modeling code. In examples, the first forward modeling code may be more computationally efficient but less accurate than the second forward modeling code. Once found, the target value matrix may be post-processed by an operator. It should be noted the post-processing may include any suitable mathematical equation, or combination of mathematical equations, such as inversion, modeling, and/or the like, to determine the location of defects and/or collars on one or more concentric pipes.

Figure 8:
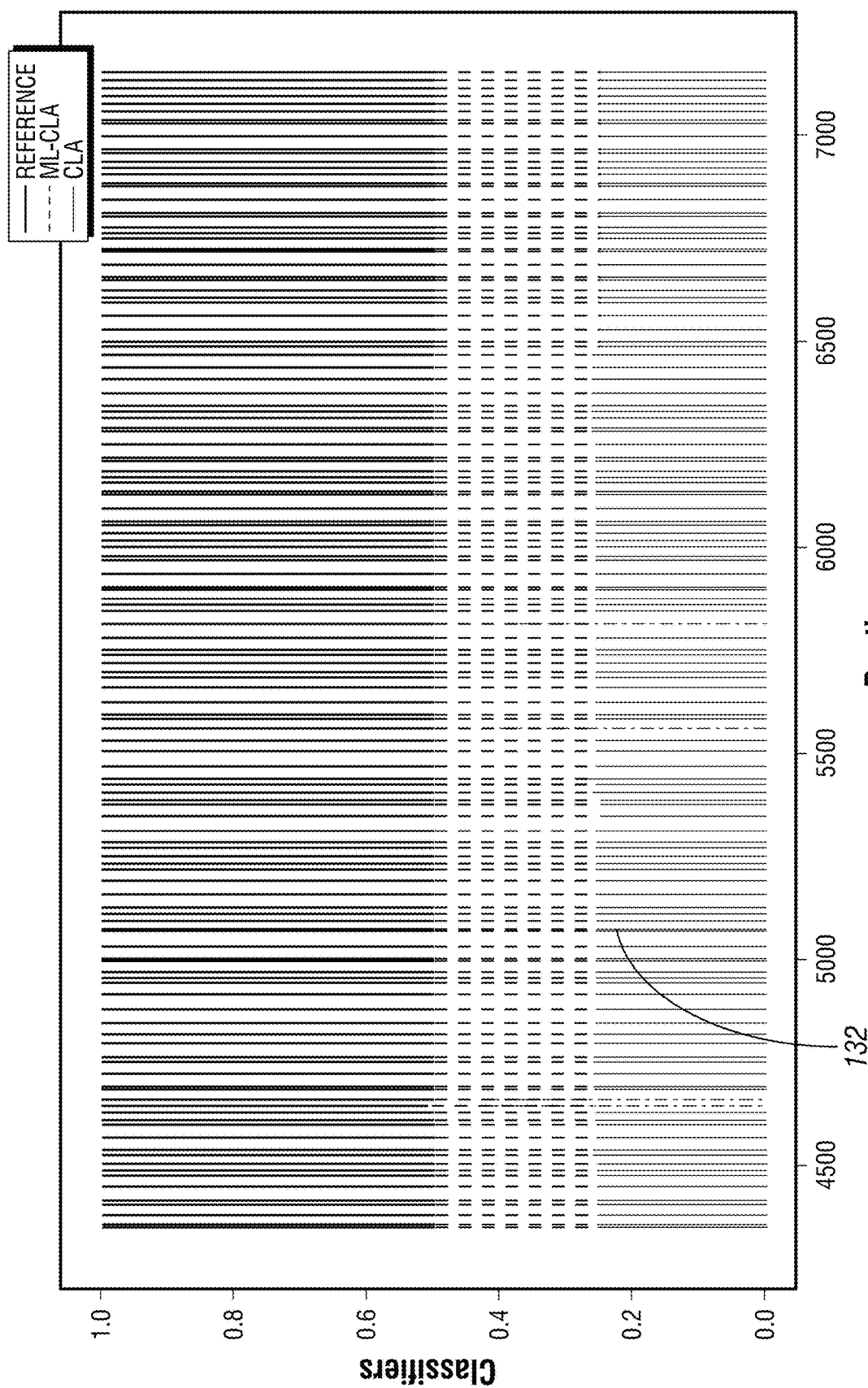
FIG. 8 illustrates a graph for identifying collars.

FIG. 8 compares collar locator method 500 (e.g., Referring to FIG. 5) with current automated collar locator algorithm picks. The training is performed using thirteen different sets of data from thirteen different wells. An Ada-boost type model is used for training operation 502 and predictor 504. The target values may be set to be proximity to any pipe with an L of 1.5 feet (about 0.5 meter). The impulses in FIG. 8 may be representative of collar pick positions (at any pipe). For example, an impulse at depth 5000 feet (about 1524 meters) indicates a collar 132 at 5000 feet (about 1524 meters). Reference picks may be obtained through a laborious manual inspection of the signals. All three results are drawn with a different magnitude (1, 0.5, and 0.25) so that overlapping results can be conveniently identified.

As illustrated in FIG. 8, collar locator method 500 (e.g., Referring to FIG. 5) detected the presence of a collar 132 for a test well it was never specifically "trained" for before. The performance was almost as well as an algorithm that was developed and tuned specifically for that purpose and for this well. It may also be seen that both collar locator method 500 and current automated methods missed some of collar picks the other one had detected.

Another method for identifying an artifact, such as a collar 132, may start with producing a forward model and a pipe configuration. The pipe configuration may include any number of parameters. It should be noted that pipe configuration parameters may include magnetic permeability of pipes, a conductivity of pipes, a diameter of pipes, an inner diameter of pipes, an outer diameter of pipes, a eccentricity of pipes, a thickness of pipes, a core properties of EM pipe inspection tool transmitters, a core properties of EM pipe inspection tool receivers, a logging depth, a location of an artifact, or an overlap of artifacts on different pipes. The forward model and the pipe configuration may be simulated to create a signal that may match an artifact disposed in the forward model and first pipe configuration. An artifact, and/or a plurality of artifacts, may be identified in the signal. A target value matrix may be constructed form the identified artifacts. Additionally, a first input matrix may be formed from the signal and a well plan. This may allow for a predictor to be constructed form the input matrix and the target value matrix. The steps disclosed above may be produced any number of times for any number of concentric pipes. This may allow an operator to view artifacts that may be disposed in the concentric pipes. In examples, the forward model may be calibrated and updated as necessary.

Figure 9:
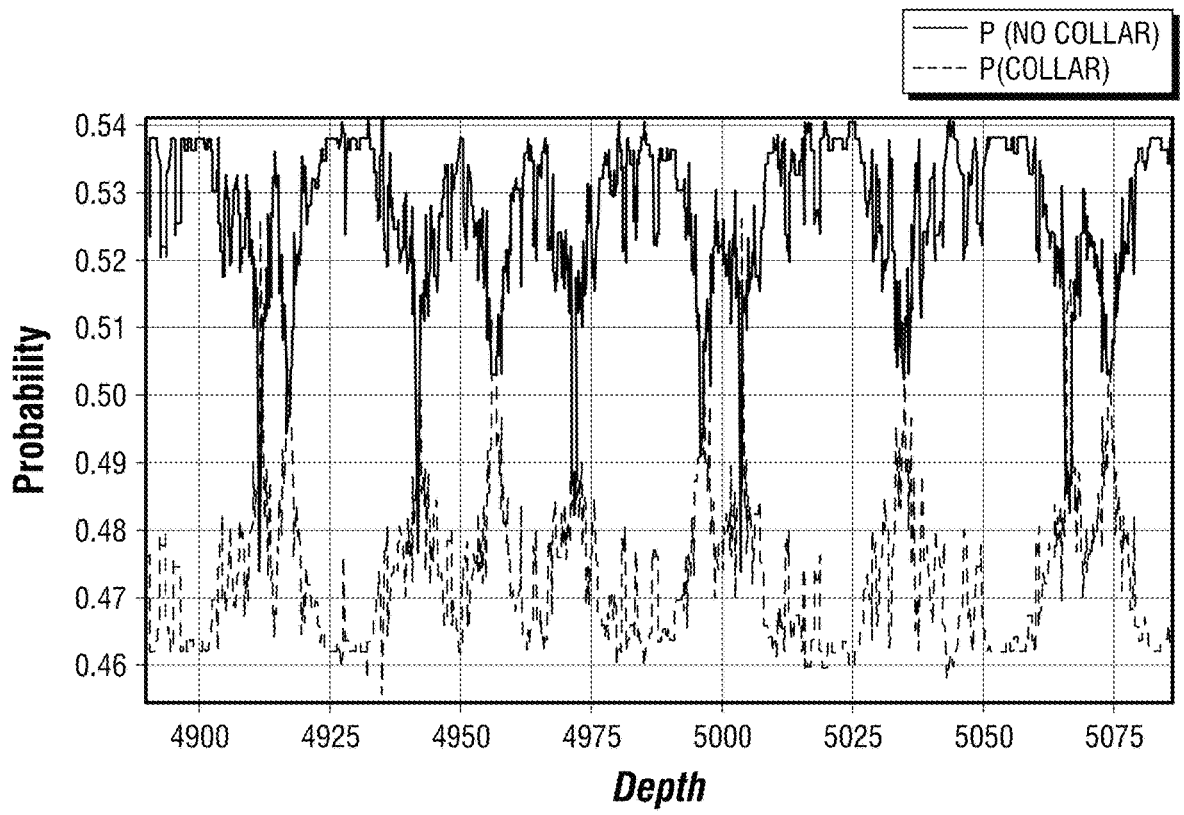
FIG. 9 illustrates a graph of probability for identifying collars.

FIG. 9 illustrates collar locator method 500 (e.g., Referring to FIG. 5) probability estimates for presence of "P(collar)" or absence "P(no collar)" of collars. When P(collar) is above 0.5, a collar indication is made, and vice-versa. It may be seen from FIG. 9 that predictor 504 (e.g., Referring to FIG. 5) performs the detection with a 1-3% margin over 50%. Although this margin is small, a very high rate of detection and small rate of false positives may be achieved.

Figure 10:
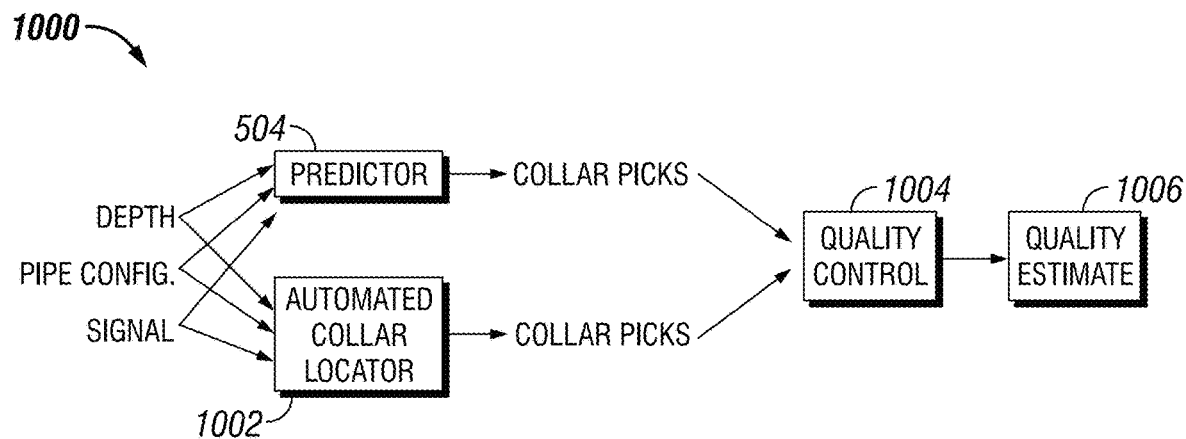
FIG. 10 illustrates a flow chart of the collar locator method with a quality control method.

Due to black-box nature of predictor 504 (e.g., Referring to FIG. 5), it may be important to obtain an indication on accuracy of the results provided by predictor 504, even outside training operation 502. FIG. 10 illustrates a box diagram 1000 of collar locator method 500 (e.g., Referring to FIG. 5). Predictor 504 is used to produce a set of collar picks as discussed above. An automated collar locator 1002 may employ conventional collar picking principles to produce a second set of collar picks. The second set of collar picks may be compared to the picks from predictor 504 in quality control 1004 to form a quality estimate 1006.

For example, quality estimate 1006 may be based as a percentage of automated collar locator picks that matched the predictor picks, based as a percentage of predictor collar picks that matched the automated collar locator picks, and/or based on the maximum or minimum of the above two. Quality estimate 1006 may be provided for the whole well at once, or it may be calculated and provided for smaller sections such as zones. Quality estimate 1006 may also be calculated over smaller overlapping periodic windows where one quality estimate 1006 may be reported for each depth around which the window may be centered, and results may be provided as a log similar to those for other tools. Low quality sections of the data may be removed from the training set to improve training performance either automatically or through manual action of an operator.

Figure 11:
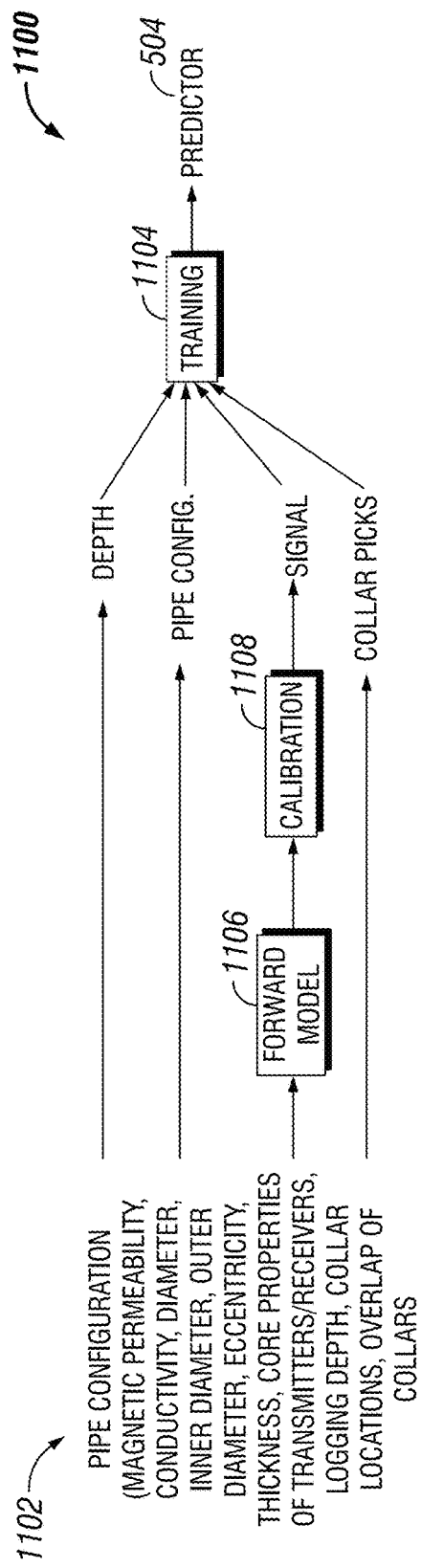
FIG. 11 illustrates a flow chart of the collar locator method with a synthetic model method.

FIG. 11 illustrates a box diagram 1100 of collar locator method 500 (e.g., Referring to FIG. 5) where synthetic models 1102 may be utilized in training 1104 of predictor 504. Machine learning methods typically require large datasets to overcome under-fitting/over-fitting problems, however the amount of real data that is available may be limited. As an example, if each well has an average of 200 pipe collars in total, 20 wells may provide a maximum of 4000 collars. This number for a training set is quite small, especially when the low variability associated with 20 wells is concerned. Thus, a computer-generated (synthetic) data may be created over a diverse set of environmental conditions and enhance the training set.

For example, forward model 1106 in FIG. 10 may be an electromagnetic simulation algorithm that may be based on finite-difference (FD), finite-element (FE), method of moments (MoM), integral equation (IE), or semi-analytical formulations. A calibration 1108 may be performed on the outputs of forward model 1106 to match them to measurements recorded from an EM logging tool 100 (e.g., Referring to FIG. 1). Calibration 1108 may be calculated by comparing recorded responses from EM logging tool 100 with modeled tool responses in the same known environment and finding a mapping method that may match simulated responses to recorded responses. This mapping may be linear and/or non-linear, where each calibrated signal may be expressed as a linear combination of uncalibrated signals.

In examples, it may be possible to use synthetic data to quality check a trained predictor 504, by inputting synthetic data to predictor 504 and comparing collar picks to known actual location of collars 132 (e.g., Referring to FIG. 1). The quality calculation may be performed using the method described in box diagram 1000, discussed above.

Figure 12:
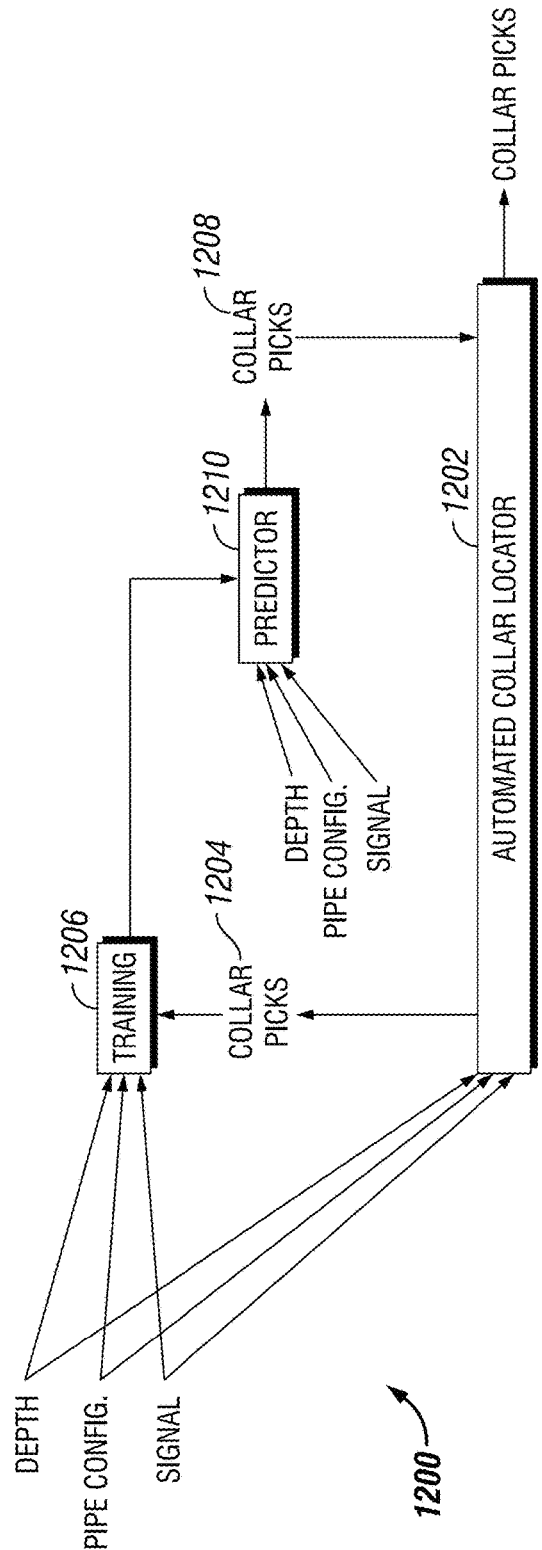
FIG. 12 illustrates a flow chart of the collar locator method with an automated collar locator method.

FIG. 12 illustrates box diagram 1200 where an automated collar locator 1202 may be integrated with collar locator method 500 (e.g., Referring to FIG. 5). In this case the depth, pipe configuration and signal for a real case may be fed to collar locator method 500 and the resulting collar picks 1204 may be used in training set 1206 of collar locator method 500. A selection based on quality may be applied to collar picks 1204 before collar picks 1204 may be fed to training 1204, where collar picks 1204 with a quality above certain threshold may be inputted. The quality of a certain collar picks 1204 may be calculated based on how close other collars 132 (e.g., Referring to FIG. 1) may be to collar pick 1240. For example, quality may be high if there are no other collars 132 within about ten feet (about 3 meters) of the current pick 1204, medium if there are no other collars within about six feet (about 2 meters) but there are collars 132 within ten feet (about three meters) of the current collar pick 1204, or low if there are collars 132 within about six feet (about two meters) of the current collar pick 1204. Following this same example, the threshold may further be selected as quality level of "high", thus effectively selecting collars 132 without any other collars 132 within about ten feet (about three meters).

In examples, collar picks 1208 from predictor 1210 may be fed back to the automated collar locator 1202 to refine collar picks 1204. Automated collar locator 1202 may use collar pick 1208 to determine a more accurate ideal signature for collars 132 associated with each pipe and to come up with better periodicity filtering or enforcement. Automated collar locator 1202 may derive ideal collar picks signatures from information of collar pick 1208. Automated collar locator 1202 may also enforce presence of collars 132 in collar pick information, and enforce periodicity constraints accordingly.

FIG. 13 illustrates an example visualization of the adaptive collar locator system results 1300. As illustrated, predictor 1210 collar picks 1208 (e.g., Referring to FIG. 12) may be taken as "suggestions" and visualized along with the existing collar picks identified by the automated collar locator 1202, or by an operator manually. The operator may then manually appraise the suggested collar picks and selectively include them in the set of operator collar picks.

Once an operator may add any of predictor's 1210 collar picks 1208 (e.g., Referring to FIG. 12) to the list, collar locator method 500 (e.g., Referring to FIG. 5) may include new picks in the training set 1206, update predictor 1210 and associated collar picks 1208 automatically. This way, collar locator method 500 has the ability to adapt to a completely new type of well by learning from operator's picks and continuously providing suggestions to the operator. If the operator deems predictor's 1210 suggested collar picks 1208 as accurate, all of the suggested collar picks 1208 may be added to operators collar pick list, effectively appraising them all. Some adaptive learning methods may allow predictor 1210 to be updated incrementally based on any new training data, rather than the whole training being repeated again. Such feature may be used in the above process to update predictor 1210 if it is available, which may reduce computational loads The adaptive learning methods described above for identifying collar signatures by EM logging tool 100 may also be applied to identifying more general types of artifacts. Deviations in the log corresponding to defects such as corrosion, abrasion, scratches, holes, cuts, grooves, scaling, manufacturing tolerances, parted casings, magnetic permeability variations, or conductivity variations are other examples of artifacts that can be identified using methods described above.

FIG. 14 illustrates a box diagram for pipe inspection system 1400 with adaptive learning capabilities. FIG. 15 illustrates an enhancement box 1500 which may comprise a set of four inversion workflow enhancement embodiments that may provide accuracy, reliability or computational cost savings. Referring to FIG. 14, module 1402 may be for "training" where a forward model may adjusted based on a "training set" data consisting of an input sample matrix 1404 and a target value matrix 1406. Here the word "matrix" is used to describe a two dimensional data structure where one dimension (rows) is sample index, and the other (columns) is data channel. It should be noted that the concepts described below may be independent of the specific choice made on the data representation of the input sample matrix 1404 and target value matrix 1406. The word "matrix" will, however, be used for convenience in the descriptions below.

Input samples of input sample matrix 1404 may include training input data, while target values of target value matrix 1406 may include training output data. Pairing the input and output data may produce a training set. Input sample matrix 1404 may include depth, pipe configuration and signal, while target value matrix 1406 may include magnetic permeability, conductivities and thicknesses corresponding to the parameters of input sample matrix 1404. It should be noted that pipe configuration parameters may include a nominal thickness, a nominal inner diameter, a nominal outer diameter, a nominal magnetic permeability, or a nominal conductivity of pipe. Any additional information, such as information from other tools (collar locator tools, neutron logging tools, acoustic logging tools etc.) may be included in input sample matrix 1404. Input sample matrix 1404 may also include an "inferior" version of results which may be improved through a machine learning algorithm.

A machine learning algorithm, may select two inputs from input sample matrix 1404 or target value matrix 1406 and may perform a training operation. Machine learning techniques that may be used for pipe inspection, which may include identifying a pipe second pipe, linear support vector machine, kernel vector machine, Gaussian process, decision tree, random forest, neural net, Ada Boost, Naive Bayes and/or quadratic classifier.

In examples, the machine learning algorithm may include pre-processing data to make data space as uniform and dimensionally independent as possible. For example, a baseline removal process may be applied to filter the low frequency baseline from an input signal, and normalization may be applied to each resulting channel, which may be a process used to obtain a variable density log ("VDL") representation of a signal for visualization. Standard pre-processing steps such as calibration may also be applied to the signal.

After the training may be applied, the resulting "predictor" may be used to predict the output given any new input that may not be in the original training set. The new input may be in the same format as the original. As disclosed, an output is at least one geometric or electromagnetic property of pipe (thickness, magnetic permeability, conductivity, etc.) as a function of depth.

As illustrated in FIG. 15, two sets of pipe parameters may be utilized in the machine learning algorithm as a first input 1502 and a target input 1504. The training may be performed in a way that makes a predictor able to operate on first input 1502 to produce target input 1504.

In first embodiment 1506, first input 1502 may be set as null (not provided or set to constant) and target input 1504 may be set to an before processing inversion results. In this case, the predictor takes the role of an inversion algorithm and provides the pipe parameters for a given signal. Here, inversion results from other steps of the inversion workflow may be used in the place of the before processing inversion results, such as after processing results.

In second embodiment 1508, first input 1502 may be set as a Fast Mode result, defined below, and target input 1504 may be set to a Full Mode result, defined below. This trains the machine learning algorithm to convert a Fast Mode result to a Full Mode result. This may be useful as the Fast Mode processes faster and inversion results may be produced quicker, while a Full Mode conversion provides accuracy in examples where thickness deviation may be large. As a result, the machine learning system may help obtain performance that is better than any of the individual methods.

In third embodiment 1510, first input 1502 may be set before processing results, while target input 1504 may be set after processing result, where processing may be defined as all of the activities associated with the workflow after unprocessed inversion results may be obtained. Thus the machine learning algorithm "learns" how to convert unprocessed inversion results to processed ones. Since processing involves many manual steps, this may significantly reduce the manual processing that may otherwise be applied.

It should be noted that the predictor's estimate may be appraised by an operator who may further process the pipe parameters and feed it back again to the predictor to obtain a second estimate (a specific application of fourth embodiment 1512 in FIG. 2). This process may be repeated iteratively until a satisfactory result may be achieved. The depth zones that the operator processed may be fed back to the training step in FIG. 2 to further improve the predictor.

Figure 16:
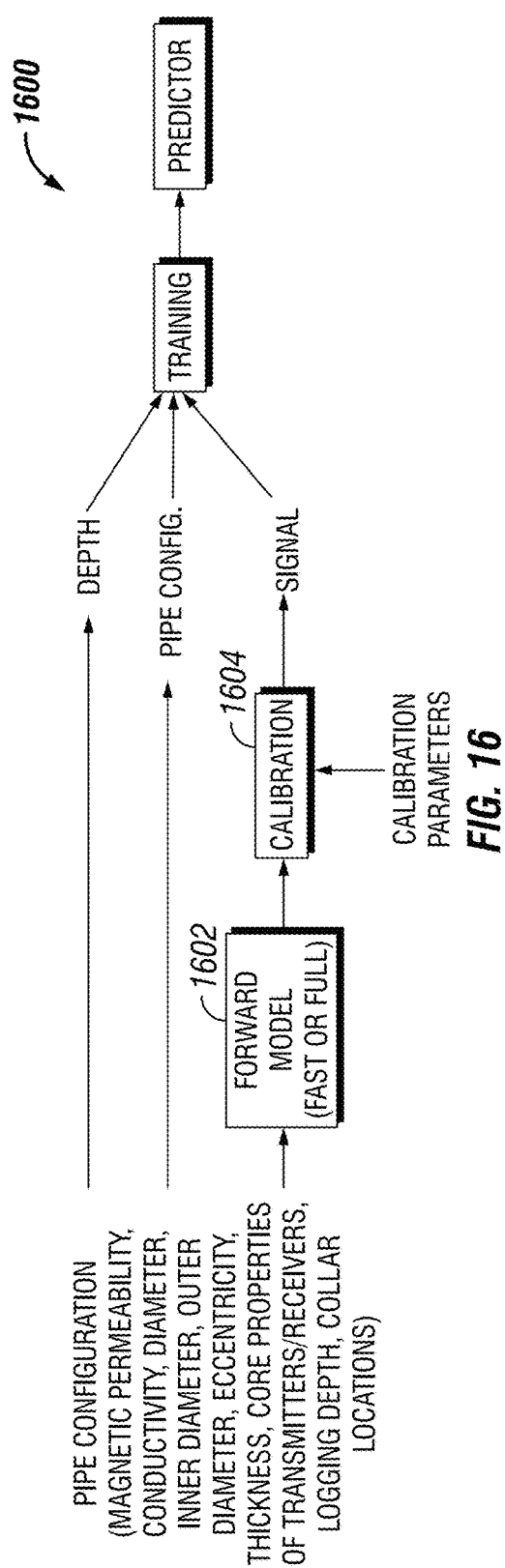
FIG. 16 illustrates a flow chart for training with a synthetic model.

FIG. 16 illustrates synthetic model 1600, which may be utilized for training the predictor. In examples, machine learning methods typically require large data-sets to overcome under-fitting/over-fitting problems. However the amount of real data that may be available (identified as "µ") may be limited. For example, if each well has an average of five different pipe configurations in total, twenty wells may provide a maximum of one hundred configurations. It should be noted that pipe configuration parameters may include a nominal thickness, a nominal inner diameter, a nominal outer diameter, a nominal magnetic permeability, or a nominal conductivity of pipe. Additionally, pipe configuration parameters may include pipe configuration parameters are a magnetic permeability of pipes, a conductivity of pipes, a diameter of pipes, an inner diameter of pipes, an outer diameter of pipes, a eccentricity of pipes, a thickness of pipes, a core properties of electromagnetic ("EM") pipe inspection tool transmitters, a core properties of EM pipe inspection tool receivers, a logging depth, a location of an artifact, or an overlap of artifacts on different pipes. This number for the training set may be small, when taking into consideration the number of possible combinations and range of pipes properties. As a result, it may be desirable to use computer-generated (synthetic) data to create a diverse large set of environmental conditions and enhance the training set in terms of its predictive range.

In FIG. 16, forward model 1602 is an electromagnetic simulation algorithm that may be based on finite-difference (FD), finite-element (FE), method of moments (MoM), integral equation (IE) or semi-analytical formulations. It may also be a linearized model (referred to as "Fast Model") where modeling may be performed for a single point and derivatives around that point (aka. Jacobian). Any modeled signal may be estimated using a combination of a single point result and the Jacobian. Alternatively a "Full Model" is used where each point is evaluated separately without the use of a Jacobian.

A calibration 1604 may be performed from the output of forward model 1602 to match the results to measurements from an EM logging tool 100, referring to FIG. 1. The calibration may be calculated by comparing responses from EM logging tool 100 with modeled tool responses in the same known environment and then finding the mapping that may match the two. This mapping may be linear, where each calibrated signal may be expressed as a linear combination of uncalibrated signals. It should be noted that the mapping may be non-linear as well. Certain calibration parameters may be input into calibration 1604, which may include coefficient limits (maximum and minimum), magnetic permeability limits (maximum and minimum), an assumed value, conductivity limits (maximum and minimum), and/or an assumed value.

Figure 17:
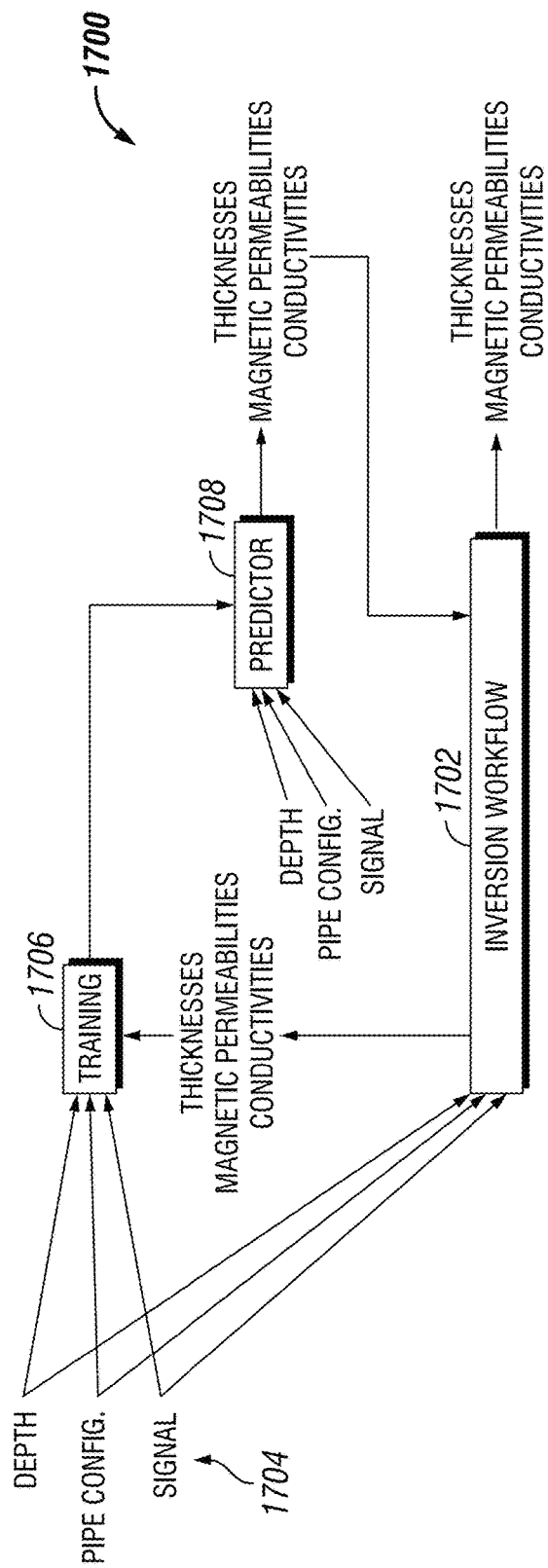
FIG. 17 illustrates a flow chart for integration with an inversion workflow.

FIG. 17 illustrates an inversion workflow 1702 integrated with the adaptive learning system 1700. In examples, the depth, pipe configuration, and signal from well measurement 1704 may be passed through inversion workflow 1702 and resulting pipe properties may be used in the training 1706 of adaptive learning system 1700. It should be noted that pipe configuration parameters may include a nominal thickness, a nominal inner diameter, a nominal outer diameter, a nominal magnetic permeability, or a nominal conductivity of pipe. A selection based on quality may be applied to the pipe property results before they may be input into training 1706, where results with a quality above certain threshold may be input into training 1706. The quality of a certain results may be calculated based on inversion misfit, eccentricity indicator, and/or a manual flag that an operator may set. For example, quality may be high if a (normalized) inversion misfit is between 0 and 0.01, medium if it is between 0.01 and 0.1, or low if it is larger than 0.1. Following this same example, the threshold may further be selected as quality level of "high", thus effectively selecting the results with an inversion misfit of 0.01 or below.

In examples, it may be possible to feed pipe parameters from predictor 1708 back in the inversion workflow 1702 to refine pipe parameters. For example, inversion workflow 1702 may use information from pipe properties to determine corrections to zone definitions or weights of the cost function in the inversion workflow 1027. Inversion workflow 1702 may also enforce the thicknesses, magnetic permeability, and conductivities to be close to the predictor results within a certain threshold. For example, the threshold may be between 5% and 75%.

Figure 18:
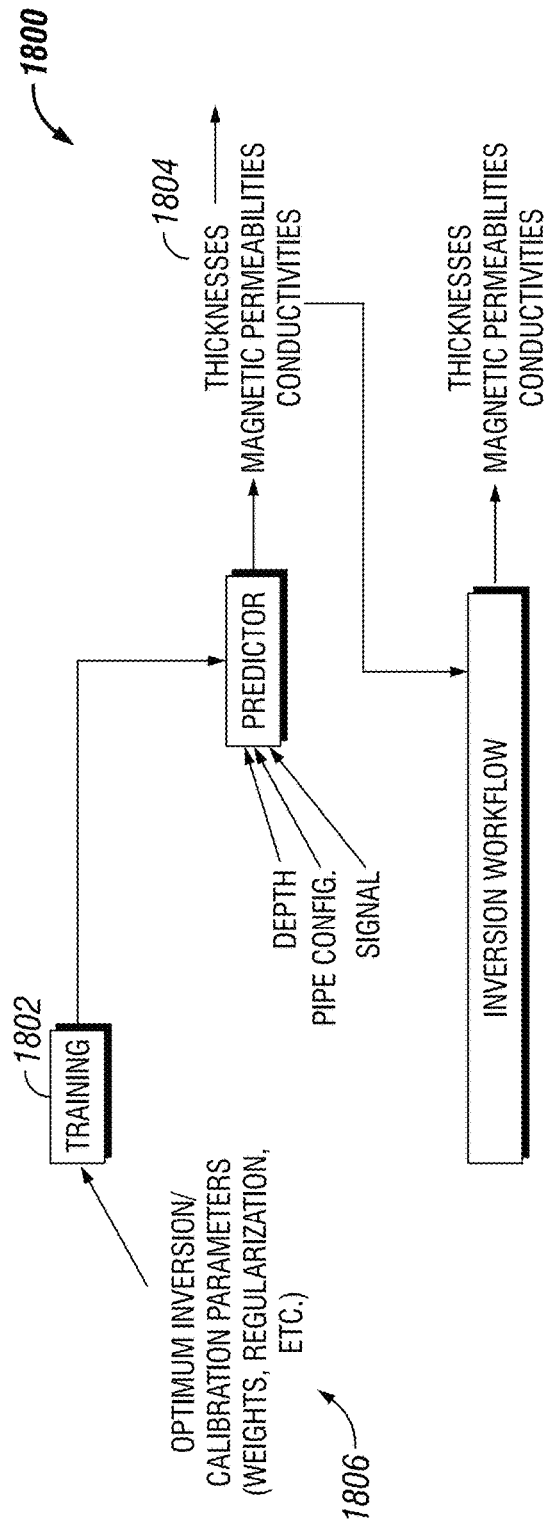
FIG. 18 illustrates a flow chart for an adaptive optimization of inversion/calibration parameters.

FIG. 18 illustrates an adaptive optimization of inversion/calibration parameters. The optimum inversion and calibration parameters may be identified by an operator and they may be provided to a machine learning algorithm along with the standard inputs as described in previous embodiments. As a result, a system may learn what inversion and calibration parameters may be ideal for which example and be able to predict the parameters given new data (depth, pipe configuration and signal). If an operator finds that the parameters may not be ideal, the operator may make further modifications which may also be fed back to training 1802 set to replace the previous inferior training pair.

Inversion parameters 1804 may be regularization parameter, channel weights, cost function threshold, form of cost function (for example polynomial coefficients), inversion zone start and end depths, inversion thickness constraints, inversion magnetic permeability and conductivity constraints, number of iterations, use of Fast Mode vs. Full Mode, and/or eccentricity constraints. Calibration parameters 1806 may be coefficient limits (maximum and minimum), magnetic permeability limits (maximum and minimum), assumed value, conductivity limits (maximum and minimum), and/or assumed value.

Figure 19:
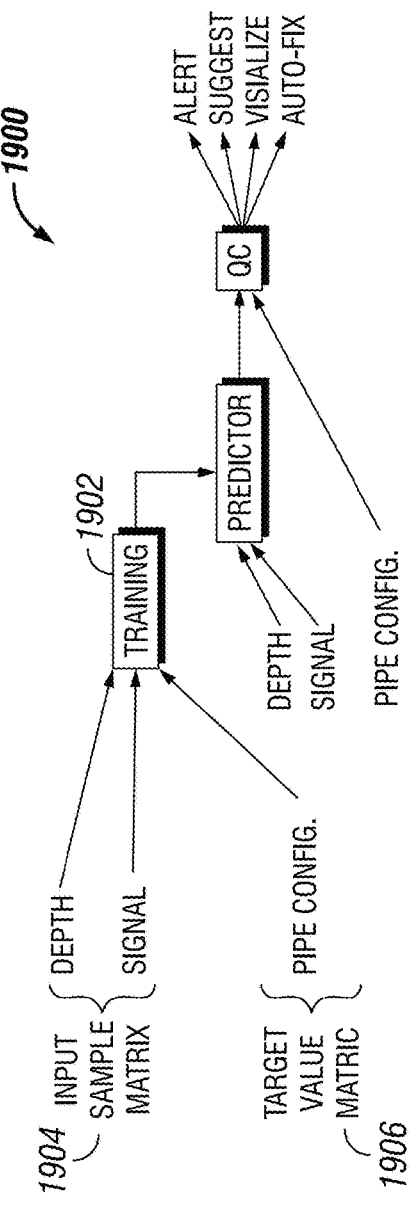
FIG. 19 illustrates a flow chart for an inversion result enhancement method.

Having accurate well plan information may be crucial for obtaining accurate inversion results. However, well plans may be inaccurate in pipe start and end depths, presence of artifacts, thicknesses, inner diameters, and/or outer diameters. FIG. 19 illustrates an example where system 1900 may be trained to estimate the well plan from a given EM corrosion measurement.

In this example, the well plan may be treated as an output rather than an input. Training 1902 may be performed by using an input sample matrix 1904, which may include a depth, and/or signal. Training 1902 may further include an associated target value matrix 1906 that may include target well plan information in any representation. In examples, the training data may be comprised of surface or lab measurements. It may also comprise of synthetic data. The synthetic data may be created by forward modeling of a set of well plans which may be chosen as the expected well plans in a particular geographical area. The predicted well plan may then be compared to a given well plan and system 1900 may operate based on the difference. For example, user may be alerted in the case of a substantially large difference between the predicted pipe configurations and given well configuration. It should be noted that pipe configuration parameters may include a nominal thickness, a nominal inner diameter, a nominal outer diameter, a nominal magnetic permeability, or a nominal conductivity of pipe. Additionally, pipe configuration parameters may also include a magnetic permeability of pipes, a conductivity of pipes, a diameter of pipes, an inner diameter of pipes, an outer diameter of pipes, a eccentricity of pipes, a thickness of pipes, a core properties of EM pipe inspection tool transmitters, a core properties of EM pipe inspection tool receivers, a logging depth, a location of an artifact, or an overlap of artifacts on different pipes. As an example, more than a five foot difference in the pipe start or end position may trigger an alert. All or part of the predicted pipe configuration may be offered to the user as a suggestion for appraisal and predicted pipe configuration may be visualized alongside of the given well plan for more convenient evaluation by the user. In examples where system 1900 may make the determination reliably, some or all features of the given well plan may be replaced by the predicted well plan. Note that a partial well plan may also be fed as a part of input sample matrix 1904.

This method and system may include any of the various features of the compositions, methods, and system disclosed herein, including one or more of the following statements.

Statement 1: A method for identifying an artifact disposed in a wellbore may comprise disposing an electromagnetic logging tool into a first wellbore; broadcasting an electromagnetic field from a transmitter disposed on the electromagnetic logging tool; energizing a casing with the electromagnetic field; recording a secondary electromagnetic field from the casing at a plurality of depths and at a plurality of frequencies; picking a first plurality of artifacts in the first signal; constructing a target value matrix from the first plurality of artifacts; producing a first input matrix from the first signal and a first well plan; constructing a predictor from the first input matrix and the target value matrix; disposing the electromagnetic logging tool into a second wellbore; broadcasting a signal from a second transmitter disposed on the second electromagnetic logging tool; recording a second signal; producing a second input matrix from the second signal; producing a second plurality of artifacts from the predictor and the second input matrix; and displaying the second plurality of artifacts to an operator.

Statement 2: The method of statement 1, further comprising creating an input sample matrix of a pipe configuration as a function of a depth and a pipe index; creating an input sample matrix of a signal as a function of the depth and a data channel; and concatenating the input sample matrix of a pipe configuration and the input sample matrix of a signal into a concatenated matrix; and assigning the concatenated matrix to the target value matrix.

Statement 3: The method of statement 1 or 2, wherein the first plurality of artifacts are picked by the operator.

Statement 4: The method of any previous statement, may further comprise picking at least one reference artifact from an external information source, comparing at least one of the second plurality of artifacts to the at least one reference artifact, and producing a quality value from the comparison of the at least one of the second plurality of artifacts to the at least one reference artifact.

Statement 5: The method of any previous statement, may further comprise removing at least one artifact from the first plurality of artifacts, and designating it as reference artifact.

Statement 6: The method of any previous statement, wherein the first plurality of artifacts in the first signal are deviations corresponding to a plurality of collars disposed on one or more concentric pipes.

Statement 7: The method of any previous statement, may further comprise creating an input sample matrix as a function of a depth and a pipe index; determining a proximity width; convolving the input sample matrix with a window of a selected shape with a width equal to the proximity width into a convolved matrix; and assigning the convolved matrix to the target value matrix.

Statement 8: The method of any previous statement, may further comprise picking a first plurality of collars with an automated collar locator.

Statement 9: The method of any previous statement, may further comprise adjusting the automated collar locator based on a second plurality of collars.

Statement 10: The method of any previous statement, may further comprise displaying to the operator a first plurality of collar picks and a second plurality of collar picks.

Statement 11: The method of any previous statement, may further comprise appraising a second plurality of collar picks.

Statement 12: The method of any previous statement, wherein the first plurality of artifacts in the first signal are deviations corresponding to a plurality of defects on one or more concentric pipes.

Statement 13: The method of any previous statement, wherein the plurality of defects comprise corrosion, abrasion, scratch, hole, cut, groove, scaling, manufacturing tolerance, parted casing, magnetic permeability variation, or conductivity variation.

Statement 14: The method of any previous statement, may further comprise creating an input sample matrix as a function of depth and a pipe configuration; and concatenating a plurality of input sample matrices corresponding to different types of defects in to a concatenated matrix; and assigning the concatenated matrix to the target value matrix.

Statement 15: The method of any previous statement, may further comprise appending an auxiliary input matrix to the input sample matrix.

Statement 16: The method of any previous statement, may further comprise estimating the auxiliary input matrix and the target value matrix with an inversion.

Statement 17: The method of any previous statement, wherein the auxiliary input matrix is from a first forward modeling code and the target value matrix is from a second forward modeling code, where the first forward modeling code is more computationally efficient but less accurate than the second forward modeling code.

Statement 18: The method of any previous statement, wherein the target value matrix is post-processed by the operator.

Statement 19: The method of any previous statement, may further comprise estimating at least one parameter of the inversion with the predictor.

Statement 20: The method of any previous statement, may further comprise creating an input sample matrix as a function of depth and a pipe index; creating an input sample matrix of a pipe configuration as a function of depth and the pipe index; and concatenating the input sample matrix and the input sample matrix of a pipe configuration into a concatenated matrix; and assigning the concatenated matrix to the target value matrix.

Statement 21: The method of any previous statement, wherein a pipe configuration parameter is a nominal thickness, a nominal inner diameter, a nominal outer diameter, a nominal magnetic permeability, or a nominal conductivity of pipe Statement 22: The method of any previous statement, may further comprise estimating at least one pipe configuration parameters by the predictor.

Statement 23: A method for identifying an artifact disposed in a wellbore may comprise producing a forward model; producing a first pipe configuration; simulating the forward model and the first pipe configuration to create a first signal; picking a first plurality of artifacts in the first signal; constructing a target value matrix from the first plurality of artifacts; producing a first input matrix from the first signal and a first well plan; constructing a predictor from the first input matrix and target value matrix; producing a second input matrix from a second signal created by the forward model with a second pipe configuration model; producing a second plurality of artifacts from the predictor and the second input matrix; and displaying the second plurality of artifacts to an operator.

Statement 24: The method of statement 23 may further comprise adding variations to the second pipe configuration, wherein pipe configuration parameters are a magnetic permeability of pipes, a conductivity of pipes, a diameter of pipes, an inner diameter of pipes, an outer diameter of pipes, a eccentricity of pipes, a thickness of pipes, a core properties of EM pipe inspection tool transmitters, a core properties of EM pipe inspection tool receivers, a logging depth, a location of an artifact, or an overlap of artifacts on different pipes.

Statement 25: The method of statement 23 of statement 24, may further comprise calibrating the forward model with real data.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying an artifact disposed in a wellbore comprising:
   disposing an electromagnetic logging tool into a first wellbore;
   broadcasting an electromagnetic field from a transmitter disposed on the electromagnetic logging tool;
   energizing a casing with the electromagnetic field;
   recording a secondary electromagnetic field from the casing at a plurality of depths and at a plurality of frequencies;
   picking a first plurality of artifacts in the first signal;
   constructing a target value matrix from the first plurality of artifacts;
   producing a first input matrix from the first signal and a first well plan;
   constructing a predictor from the first input matrix and the target value matrix;
   disposing the electromagnetic logging tool into a second wellbore;
   broadcasting a signal from a second transmitter disposed on a second electromagnetic logging tool;
   recording a second signal;
   producing a second input matrix from the second signal;
   producing a second plurality of artifacts from the predictor and the second input matrix; and
   displaying the second plurality of artifacts to an operator.

2. The method of claim 1, further comprising:
   creating an input sample matrix of a pipe configuration as a function of a depth and a pipe index;
   creating an input sample matrix of a signal as a function of the depth and a data channel; and
   concatenating the input sample matrix of a pipe configuration and the input sample matrix of a signal into a concatenated matrix; and
   assigning the concatenated matrix to the target value matrix.

3. The method of claim 1, wherein the first plurality of artifacts are picked by the operator.

4. The method of claim 1, further comprising picking at least one reference artifact from an external information source, comparing at least one of the second plurality of artifacts to the at least one reference artifact, and producing a quality value from the comparison of the at least one of the second plurality of artifacts to the at least one reference artifact.

5. The method of claim 4, further comprising removing at least one artifact from the first plurality of artifacts, and designating it as reference artifact.

6. The method of claim 1, wherein the first plurality of artifacts in the first signal are deviations corresponding to a plurality of collars disposed on one or more concentric pipes.

7. The method of claim 6, further comprising:
   creating an input sample matrix as a function of a depth and a pipe index;
   determining a proximity width;
   convolving the input sample matrix with a window of a selected shape with a width equal to the proximity width into a convolved matrix; and
   assigning the convolved matrix to the target value matrix.

8. The method of claim 6, further comprising picking a first plurality of collars with an automated collar locator.

9. The method of claim 8, further comprising adjusting the automated collar locator based on a second plurality of collars.

10. The method of claim 6, further comprising displaying to the operator a first plurality of collar picks and a second plurality of collar picks.

11. The method of claim 6, further comprising appraising a second plurality of collar picks.

12. The method of claim 1, wherein the first plurality of artifacts in the first signal are deviations corresponding to a plurality of defects on one or more concentric pipes.

13. The method of claim 12, wherein the plurality of defects comprise corrosion, abrasion, scratch, hole, cut, groove, scaling, manufacturing tolerance, parted casing, magnetic permeability variation, or conductivity variation.

14. The method of claim 12, further comprising
   creating an input sample matrix as a function of depth and a pipe configuration;

concatenating a plurality of input sample matrices corresponding to different types of defects in to a concatenated matrix; and assigning the concatenated matrix to the target value matrix.

15. The method of claim 14, further comprising appending an auxiliary input matrix to the input sample matrix.

16. The method of claim 15, further comprising estimating the auxiliary input matrix and the target value matrix with an inversion.

17. The method of claim 16, wherein the auxiliary input matrix is from a first forward modeling code and the target value matrix is from a second forward modeling code, where the first forward modeling code is more computationally efficient but less accurate than the second forward modeling code.

18. The method of claim 16, wherein the target value matrix is post-processed.

19. The method of claim 16, further comprising estimating at least one parameter of the inversion with the predictor.

20. The method of claim 12, further comprising:
creating an input sample matrix as a function of depth and a pipe index;
creating an input sample matrix of a pipe configuration as a function of depth and the pipe index;
concatenating the input sample matrix and the input sample matrix of a pipe configuration into a concatenated matrix; and
assigning the concatenated matrix to the target value matrix.

21. The method of claim 20, wherein a pipe configuration parameter is a nominal thickness, a nominal inner diameter, a nominal outer diameter, a nominal magnetic permeability, or a nominal conductivity of pipe.

22. The method of claim 20, estimating at least one pipe configuration parameters by the predictor.

23. A method for identifying an artifact disposed in a wellbore comprising:
producing a forward model;
producing a first pipe configuration;
simulating the forward model and the first pipe configuration to create a first signal;
picking a first plurality of artifacts in the first signal;
constructing a target value matrix from the first plurality of artifacts;
producing a first input matrix from the first signal and a first well plan;
constructing a predictor from the first input matrix and target value matrix;
producing a second input matrix from a second signal created by the forward model with a second pipe configuration model;
producing a second plurality of artifacts from the predictor and the second input matrix; and
displaying the second plurality of artifacts to an operator.

24. The method of claim 23, further comprising adding variations to the second pipe configuration, wherein pipe configuration parameters are a magnetic permeability of pipes, a conductivity of pipes, a diameter of pipes, an inner diameter of pipes, an outer diameter of pipes, a eccentricity of pipes, a thickness of pipes, a core properties of EM pipe inspection tool transmitters, a core properties of EM pipe inspection tool receivers, a logging depth, a location of an artifact, or an overlap of artifacts on different pipes.

25. The method of claim 23, further comprising calibrating the forward model with real data.

* * * * *